US006679340B1

United States Patent
Tatai

(10) Patent No.: US 6,679,340 B1
(45) Date of Patent: Jan. 20, 2004

(54) HYDRAULIC TOOL

(75) Inventor: Tadashi Tatai, Nagano (JP)

(73) Assignee: Izumi Products Company, Matsumoto (JP)

( * ) Notice: Subject to any disclaimer, the term of this patent is extended or adjusted under 35 U.S.C. 154(b) by 0 days.

(21) Appl. No.: 10/200,143

(22) Filed: Jul. 23, 2002

(51) Int. Cl.$^7$ ............................................. F15B 15/22
(52) U.S. Cl. ........................ 173/206; 173/138; 91/428; 60/452
(58) Field of Search ................................. 173/206, 207, 173/208, 138; 91/428, 444, 454, 437; 92/108, 163; 60/452, 477; 72/453.16, 453.02

(56) References Cited

U.S. PATENT DOCUMENTS

| 4,366,673 A | * | 1/1983 | Lapp ............................ 60/477 |
| 4,860,646 A | * | 8/1989 | Spiers ........................... 60/377 |
| 5,419,129 A | * | 5/1995 | Becker et al. ................. 60/452 |
| 5,442,992 A | * | 8/1995 | Sanner et al. ................. 91/428 |
| 5,778,755 A |   | 7/1998 | Boese |
| 6,446,482 B1 | * | 9/2002 | Heskey et al. ........... 72/453.16 |
| 6,490,962 B1 | * | 12/2002 | Schultz ........................ 91/428 |

* cited by examiner

*Primary Examiner*—Scott A. Smith
(74) *Attorney, Agent, or Firm*—Birch, Stewart, Kolasch & Birch, LLP

(57) ABSTRACT

In the hydraulic tool, a main body section includes a cylinder and a piston. A head section is attached to the cylinder, includes a movable part. The piston is capable of rotating about the cylinder with the movable part. A control section is provided to the cylinder and includes oil paths and a switching valve. A piston valve reciprocally moves to control communication between a first and a second cylinder chambers. A concave is provided in a bottom face of the cylinder, escapes an end of the piston valve from a position at which the end of the piston valve contacts a bottom face, and shuts off the communication between the chambers. A projection is provided at a position different from the concave, makes the end of the piston valve contact the bottom face and allows the communication between the chambers.

5 Claims, 3 Drawing Sheets

HYDRAULIC TOOL

BACKGROUND OF THE INVENTION

The present invention relates to a hydraulic tool, more precisely relates to a hydraulic tool, in which a piston is reciprocally moved by a constant pressure pump and a constant volume pump.

Various types of hydraulic tools are used for connecting and cutting wires. A constant pressure pump and a constant volume pump have been used as pressure sources of the hydraulic tools. In the conventional hydraulic tools, the constant pressure pump or the constant volume pump is used as the pressure source.

However, manufacturing cost for manufacturing the both types of tools must be high. Further, in the case of selectively using the constant pressure pump and the constant volume pump, two types of the hydraulic tools must be prepared.

To solve the problems, a hydraulic tool capable of employing the constant pressure pump and the constant volume pump was provided in the constant pressure pump and the constant volume pumps as set forth in U.S. Pat. No. 5,778,755. In the hydraulic tool, a spool valve is opened and closed by an adjustment shaft and a seal nut so as to selectively use the constant pressure pump and the constant volume pump as the pressure source.

However, in the hydraulic tool of said U.S. patent, two adjustment screws are alternately and evenly tightened and loosened so as to change the pressure source. Therefore, changing the pressure source or the pump is troublesome. After the adjustment shaft is positioned by the seal nut, the seal nut is sometimes loosened, so that the position of the adjustment shaft is shifted. Further, an inside of the tool cannot be seen, so the position of the adjustment shaft should be indirectly known on the basis of a projected length of the adjustment shaft, which is projected from an end of a body of the tool, only. Furthermore, in the case of employing the constant pressure pump, the adjustment shaft is projected from the body much longer, so the adjustment shaft is apt to collide with other members and be damaged.

SUMMARY OF THE INVENTION

An object of the present invention is to provide a hydraulic tool capable of employing a constant pressure pump and a constant volume pump, easily switching the pumps, and correctly setting a switching position.

To achieve the object, the hydraulic tool of the present invention comprises:

a main body section including a cylinder and a piston;

a head section being attached to a front part of the cylinder, the head section including a movable part which is pushed by the piston, wherein the piston is capable of rotating about an axial line of the cylinder with the movable part;

a control section being provided to a rear part of the cylinder, the control section including oil paths, which connect the cylinder to a pressure source, and a switching valve, which is actuated by operating a handle so as to control an oil in the oil paths;

a piston valve being provided to the piston, the piston valve reciprocally moving in the axial direction of the cylinder so as to control communication between a first cylinder chamber, which is provided on a front side of the piston, and a second cylinder chamber, which is provided on a rear side of the piston;

a concave being provided in a bottom face of the cylinder, the concave escaping an end of the piston valve from a position at which the end of the piston valve contacts a bottom face of the cylinder, and shutting off the communication between the first cylinder chamber and the second cylinder chamber when the piston valve moves toward the concave and the piston contacts the bottom face of the cylinder; and a projection being provided at a position different from the concave in the bottom face of the cylinder, the projection making the end of the piston valve contact the bottom face of the cylinder and allowing the communication between the first chamber and the second cylinder chamber when the piston valve moves toward the projection and the piston contacts the bottom face of the cylinder.

The hydraulic tool may further comprise a pair of seal heads being respectively provided to one end of the piston valve, which is located on the first chamber side, and the other end thereof, which is located on the second chamber side, the seal heads contacting a side face of the piston so as to shut off an oil path communication between the first chamber of the piston to the second chamber thereof.

In the hydraulic tool, a pair of the piston valves may be symmetrically provided with respect to a center of the cylinder, the concaves for accommodating the seal heads are formed in the bottom face of the cylinder.

The hydraulic tool may further comprise a head holder being provided to a cylinder head which is provided to the front part of the cylinder, the head holder holding the head section in a first state, in which the end of the piston valve is located in the concave, and a second state, in which the end of the piston valve contacts the projection.

The hydraulic tool may further comprises a relief valve being provided to the switching valve, wherein the oil, which has been introduced into an IN-port of the control section, is returned to an OUT-port thereof via the switching valve when the piston is pushed by the oil and oil pressure in the second chamber reaches prescribed pressure.

In the hydraulic tool of the present invention, the end of the piston valve can be moved between a position, at which the end of the piston valve is located in the concave of the cylinder, and another position, at which the end of the piston valve contacts the projection of the cylinder, by rotating the head section with respect to the cylinder. Namely, the pressure sources, which are a constant pressure source and a constant volume source, can be easily exchanged. Switching actions for exchanging the pressure source is the rotation of the head section, so reliability of the actions can be higher. Further, the positions for switching the pressure source can be easily visually known.

BRIEF DESCRIPTION OF THE DRAWINGS

Preferred embodiments of the present invention will now be describe by way of examples and with reference to the accompanying drawings, in which.

DETAILED DESCRIPTION OF THE EMBODIMENTS

Preferred embodiments of the present invention will now be described in detail with reference to the accompanying drawings.

Figure 1:
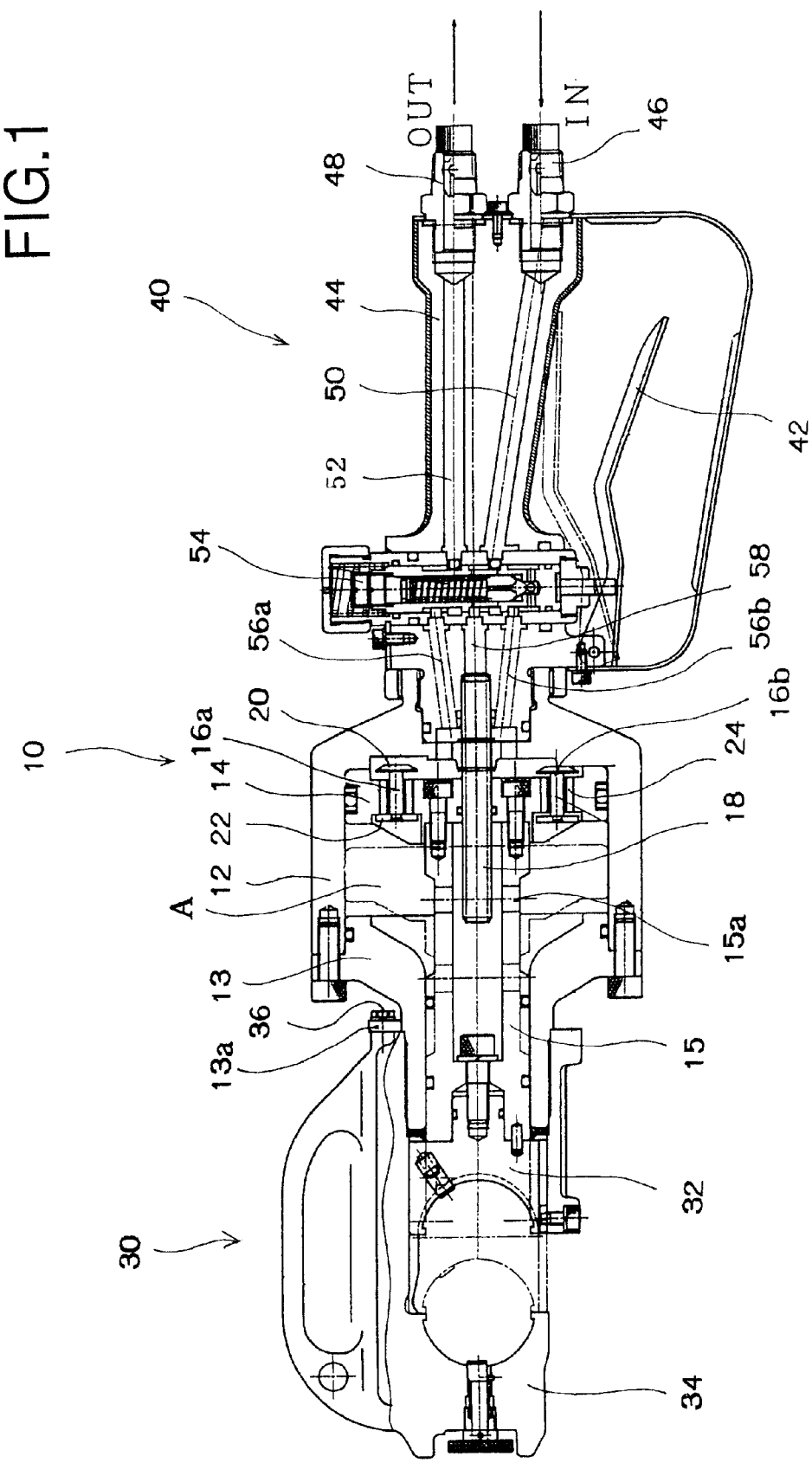
FIG. 1 is a sectional view of a hydraulic tool of an embodiment of the present invention.

FIG. 1 is a sectional view of a hydraulic tool of the present invention. The tool is used for compressing a work piece.

The hydraulic tool comprises: a main body section 10; a head section 30 attached to a front part of the main body section 10; and a control section 40 provided to a rear part of the main body section 10. By gripping a handle 42 of the control section 40, a movable damper 32 of the head section 30 is moved toward a fixed damper 34, so that they can compress the work piece. Note that, the movable damper 32 acts as a movable part.

The main body section 10 includes: a cylinder 12; a piston 14 liquid-tightly fitted in the cylinder 12 and capable of sliding on an inner circumferential face of the cylinder 12; a piston head 15 coaxially fixed to a front part of the piston 14; and piston valves 16a and 16b attached to the piston 14.

The piston head 15 is formed into a cylindrical shape, and its diameter is shorter than that of the piston 14. The piston head 15 is integrated with piston 14 and extended toward the head section 30. An outer circumferential face of the piston head 15 and an inner circumferential face of the cylinder head 13 forwardly extended from the cylinder 12 are also liquid-tightly fitted and sealed.

The movable damper 32 is fixed to a front end part of the piston head 15. The piston head 15, which is liquid-tightly fitted in the cylinder head 13, is capable of moving in the axial direction with respect to the cylinder head 13.

A first cylinder chamber "A" is enclosed by the cylinder 12, the cylinder head 13, the piston 14 and the piston head 15.

Ends of communication paths 15a are opened in a side face of the piston head 15. The communication paths communicate the first cylinder chamber "A" with an inner space of the piston head 15. An inner cylinder 18 is extended from the control section 40 and coaxially inserted in the piston head 15. The inner cylinder 18 communicates the inner space of the piston head 15 with pressure sources.

The piston valves 16a and 16b of the piston 14 are important members for moving the piston 14 and connecting the hydraulic tool to a constant pressure pump and a constant volume pump. In the present embodiment, the piston valves 16a and 16b are symmetrically provided with respect to the center of the piston 14. The piston valves 16a and 16b are respectively inserted in through-holes, which are bored in the piston 14, and capable of moving in the axial directions. Seal heads 20 and 22 are respectively provided to the both ends of each of the piston valves 16a and 16b. The seal heads 20 are provided on a bottom side of cylinder 12; the seal heads 22 are provided on the first cylinder chamber "A" side with respect to the piston 14.

Figure 2:
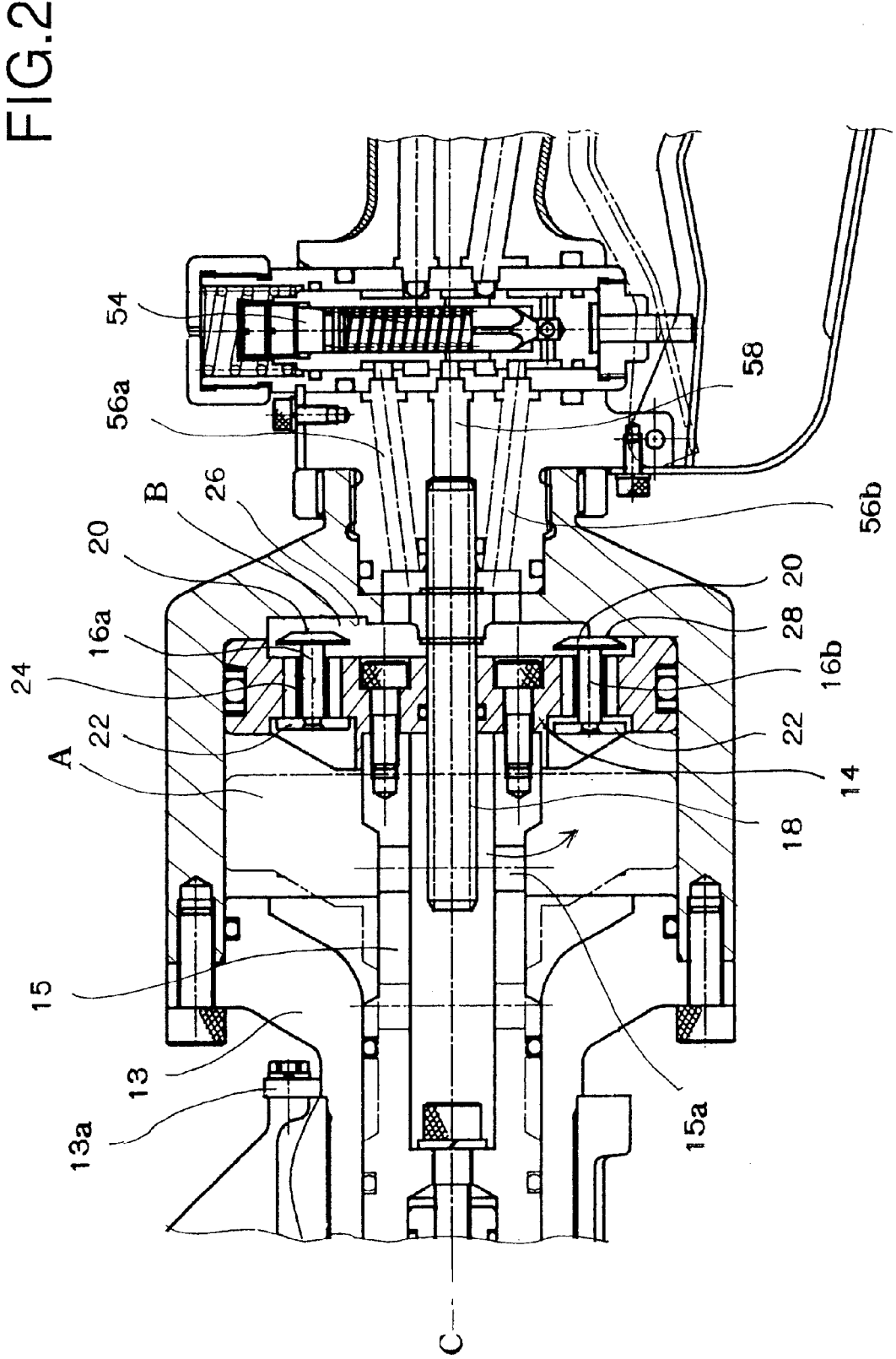
FIG. 2 is an enlarged view of piston valves.

FIG. 2 is an enlarged view of the piston valves 16a and 16b attached to the piston 14. Note that, an upper side of a center line "C" shows a first state (a closed-center state or a C-C state); a lower side of the center line "C" shows a second state (an open-center state or an O-C state). The piston valves 16a and 16b control communication of an oil between the first cylinder chamber "A" and a second cylinder chamber "B", which is enclosed by the piston 14 and a bottom part of the cylinder 12. With this structure, the seal heads 20 and 22 of the piston valves 16a and 16b close communication paths 24, which are through-holes bored in the piston 14, when the piston valves 16a and 16b are moved in the axial directions and the seal heads 20 and 22 contact a side face of the piston 14. Diameters of the seal heads 20 and 22 are greater than those of the communication paths 24.

In FIGS. 1 and 2, the piston 14 is located at the innermost position. In the present embodiment, concaves and a projection are formed in a bottom face (an inner bottom face) of the cylinder 12 so as to connect the hydraulic tool to the constant pressure pump and the constant volume pump.

In the upper side of the center line "C" of FIG. 2, the concave 26 formed in the bottom face of the cylinder 12 is shown; in the lower side of the center line "C" of FIG. 2, the projection 28 formed in the bottom face of the cylinder 12 is shown. Positions of the concaves 26 and the projection 28 are defined on the basis of the arrangement of the piston valves 16a and 16b. The arrangement of the concaves 26 and the projection 28 in the bottom face of the cylinder 12 is shown in FIG. 3.

Figure 3:
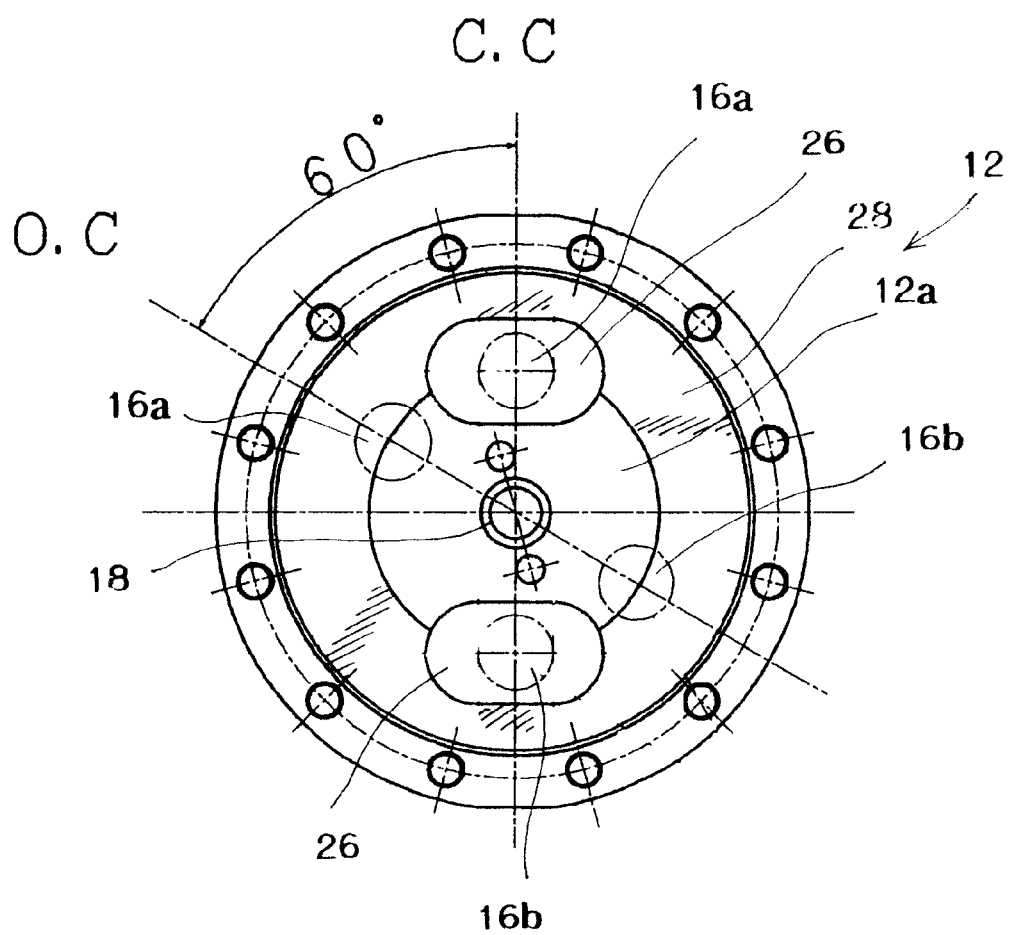
FIG. 3 is a plan view of a bottom face of a cylinder.

In FIG. 3, the concaves 26 are formed in the bottom face of the cylinder 12 and symmetrically arranged with respect to the center of the bottom face of the cylinder 12 so as to correspond to the arrangement of the piston valves 16a and 16b. In the present embodiment, the concaves 26 are formed into elliptical concaves. The concaves 26 are capable of accommodating the seal heads 20 of the piston valves 16a and 16b. Depth of the concaves 26 are designed to allow the seal heads 22, which are provided on the first cylinder chamber "A" side, to contact the side face of the piston 14 when the piston 14 contact the bottom face of the cylinder 12.

As shown in FIG. 2, the projection 28 is formed so as to form the second cylinder chamber "B", which is formed near the bottom face of the cylinder 12, when an end face of the piston 14 contacts the bottom face of the cylinder 12. As shown in FIG. 3, in the case that the piston valves 16a and 16b are shifted from the concaves 26, the seal heads 20 of the piston valves 16a and 16b contact the projection 28. In the present embodiment, a flat part 12a is formed at the center of the bottom face of cylinder 12. A top face of the flat part 12a is slightly projected from inner bottom faces of the concaves 26. The projection 28 enclosing the flat part 12a is formed into a ring-shape with fixed width. In the present embodiment, the seal heads 20 of the piston valves 16a and 16 partially contact an inner edge of the projection 28. A top face of the projection 28 is slightly projected from the top face of the flat part 12a. With this structure, the oil can easily flow in the second cylinder chamber "B", and oil pressure can be uniformly applied to the piston valves 16a and 16b.

In the present embodiment, as shown in FIG. 3, the hydraulic tool has two states. One is the state in which the piston valves 16a and 16b correspond to the concaves 26; the other is the state in which the piston valves 16a and 16b are shifted from the concaves 26 and correspond to the projection 28. A user can select the states. In FIG. 3, the piston valves 16a and 16b can be rotated 60° so as to change the positions of the piston valves 16a and 16b.

To change the positions of the-piston valves 16a and 16b, the head section 30, which is attached to the cylinder head 13, is rotated about its axial line. A holder 13a (see FIG. 1) holds the head section 30 at two positions. One is the position for connecting to the constant pressure pump (the C-C state); the other is the position for connecting to the constant volume pump (the O-C state). When a screw 36 of the holder 13a is loosened and the head section 30 is rotated about its axis, The piston 14 is relatively rotated together with the movable damper 32 and the piston head 15 with respect to the cylinder 12, so that the state of the hydraulic tool can be changed between the C-C state and the O-C state (see FIG. 3). In the present embodiment, the head section 30 is rotated 60° so as to change the state, the rotational angle of the head section 30 is not limited to 60°. The rotational angle of the head section 30 for changing the state can be optionally designed.

As shown in FIG. 1, the control section 40 includes a main part 44, an IN-port 46 and an OUT port 48. The ports 46 and 48 are provided at a rear end of the main part 44. The ports 46 and 48 are respectively communicated with a switching valve 54 via an IN-path 50 and an OUT-path 52. The second cylinder chamber "B" is communicated with the switching valve 54 via paths 56a and 56b. The switching valve 54 is communicated with the inner cylinder 18 via a path 58. Therefore, the first cylinder chamber "A" is communicated with the switching valve 54 via the paths 15a of the piston head 15, the inner cylinder 18 and the path 58.

Successively, action of the hydraulic tool will be explained.

Firstly, in the state shown in FIG. 1, the piston 14 contacts the bottom face of the cylinder 12, and the movable damper 32 is opened with respect to the fixed clamper 34. When the user grips the handle 42, the switching valve 54 introduces the oil into the second cylinder chamber "B" via the IN-port 46, which has been connected to the pressure source, and the paths 50, 56a and 56b. By introducing the oil into the second cylinder chamber "B", the piston valves 16a and 16b are pushed by oil pressure, so that the seal heads 20 contact an end face of the piston 14. With this action, the paths 24, which are formed in the piston 14 and which communicate the first cylinder chamber "A" with the second cylinder chamber "B", are closed.

When the seal heads 20 of the piston valves 16a and 16b close the paths 24, the oil pressure in the second cylinder chamber "B" rises, so that the piston 14 is moved. With this action, the movable damper 32 is moved toward the fixed damper 34, so that the work piece can be compressed therebetween.

When the piston 14 is moved, the oil in the first cylinder chamber "A" is introduced to the OUT-port 48 via the paths 15a, the inner cylinder 18, the path 58 and the switching valve 54 and discharged there from. When the oil pressure in the second cylinder chamber "B" reaches a prescribed pressure, a relief valve 54 of the switching valve 54 is opened, so that the oil from the IN-port 46 is returned to the OUT-port 48 via the switching valve 54.

While the user grips the handle 42, the movable damper 32 and the fixed damper 34 clamp the work piece with fixed compressing force. On the other hand, if the user releases the handle 42, the switching valve 54 is switched, so that the oil from the IN-port 46 is introduced into the first cylinder chamber "A" via the path 58, the inner cylinder 18 and the paths 15a. By introducing the oil into the first cylinder chamber "A", firstly the piston valves 16a and 16b are moved, and the seal heads 22, which are provided on the first cylinder chamber "A" side, close the paths 24 of the piston 14. By closing the paths 24 by the seal heads 22, the oil in the first cylinder chamber "A" pushes the piston 14. Namely, the work piece is released from the clampers. When the piston 14 is moved to release the work piece, the oil in the second cylinder chamber "B" is discharged from the OUT-port 48 via the paths 56a and 56b and the switching valve 54.

By operating the handle 43, the piston 14 is reciprocally moved, so that the compressing work can be executed. In both cases of employing the constant pressure pump (the C-C state) and the constant volume pump (the O-C state), the action of the piston valve 16a and 16b while the reciprocal movement of the piston 14 are the same. However, the states of the piston valves 16a and 16b, which return to the bottom of the cylinder 12, in the C-C state and the O-C state are different.

In FIG. 2, the C-C state is shown in the upper side of the center line "C". While the piston 14 returns to the bottom of the cylinder 12, the seal heads 22 of the piston valves 16a and 16b contact the side face of the piston 14, so that the first cylinder chamber "A" is not communicated with the second cylinder chamber "B". The piston valves 16a and 16b correspond to the concaves 26, so the seal heads 20 do not contact the bottom of the cylinder. Therefore, the seal heads 22 contact the side face of the piston 14 while the piston 14 returns to the bottom of the cylinder 12. With this action, the oil pressure in the second cylinder chamber "B" of the cylinder 12 is maintained in the C-C state. In this state, no oil is introduced from the IN-port 46, and the oil is bypassed in the pressure source.

On the other hand, the O-C state is shown in the lower side of the center line "C". When the piston 14 returns to the bottom of the cylinder 12, the seal heads 20 of the piston valves 16a and 16b contact the projection 28 formed in the bottom face of the cylinder 12. In the state that the piston 14 is completely stopped, gaps are formed between the seal heads 22, which are provided on the first cylinder chamber "A" side, and the side face of the piston 14, so that the first cylinder chamber "A" is communicated with the second cylinder chamber "B" via the paths 24. Therefore, the oil in the first cylinder chamber "A" is introduced to the OUT-port 48 via the paths 24, the second cylinder chamber "B" and the switching valve 54 and discharged there from. Namely, in the O-C state, volume of the oil flowing through the first cylinder chamber "A" and the second cylinder chamber "B" is fixed while the piston 14 is located.at.the bottom of the cylinder 12.

As described above, in the hydraulic tool of the preset embodiment, the constant pressure pump and the constant volume pump can be selectively employed, as the pressure source, by rotating the head section 30, in a prescribed angle, about its axial line. Unlike the conventional tool in which the pump is exchanged by adjusting shafts and screws, the hydraulic tool of the present embodiment has no adjustment shafts and screws, and two types of the pumps can be selected by rotating the head section 30. Therefore, the pumps can be securely exchanged. Further, the pumps can be exchanged by rotating the head section 30 in two directions only, so the exchange can be easily executed. The rotational positions of the head section 30 can be seen, so the exchange can be correctly executed. If identification marks for the constant pressure pump and the constant volume pump are provided to the cylinder 12, the exchange can be executed easier.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A hydraulic tool, comprising:

a main body section including a cylinder and a piston;

a head section being attached to a front part of the cylinder, said head section including a movable part which is pushed by the piston, wherein the piston is capable of rotating about an axial line of the cylinder with the movable part;

a control section being provided to a rear part of the cylinder, said control section including oil paths, which connect the cylinder to a pressure source, and a switching valve, which is actuated by operating a handle so as to control an oil in the oil paths;

a piston valve being provided to the piston, said piston valve reciprocally moving in the axial direction of the cylinder so as to control communication between a first cylinder chamber, which is provided on a front side of the piston, and a second cylinder chamber, which is provided on a rear side of the piston;

a concave being provided in a bottom face of the cylinder, said concave escaping an end of said piston valve from a position at which the end of said piston valve contacts a bottom face of the cylinder, and shutting off the communication between the first cylinder chamber and the second cylinder chamber when the piston valve moves toward said concave and the piston contacts the bottom face of the cylinder; and a projection being provided at a position different from said concave in the bottom face of the cylinder, said projection making the end of the piston valve contact the bottom face of the cylinder and allowing the communication between the first chamber and the second cylinder chamber when the piston valve moves toward said projection and the piston contacts the bottom face of the cylinder.

2. The hydraulic tool according to claim 1, further comprising a pair of seal heads being respectively provided to one end of the piston valve, which is located on the first chamber side, and the other end thereof, which is located on the second chamber side, said seal heads contacting a side face of the piston so as to shut off an oil path communication the first chamber of the piston to the second chamber thereof.

3. The hydraulic tool according to claim 2, wherein a pair of the piston valves are symmetrically provided with respect to a center of the cylinder, the concaves for accommodating the seal heads are formed in the bottom face of the cylinder.

4. The hydraulic tool according to claim 1, further comprising a head holder being provided to a cylinder head which is provided to the front part of the cylinder, said head holder holding said head section in a first state, in which the end of the piston valve is located in said concave, and a second state, in which the end of the piston valve contacts said projection.

5. The hydraulic tool according to claim 1, further comprising a relief valve being provided to the switching valve, wherein the oil, which has been introduced into an IN-port of said control section, is returned to an OUT-port thereof via the switching valve when the piston is pushed by the oil and oil pressure in the second chamber reaches prescribed pressure.

* * * * *